Patented May 24, 1932

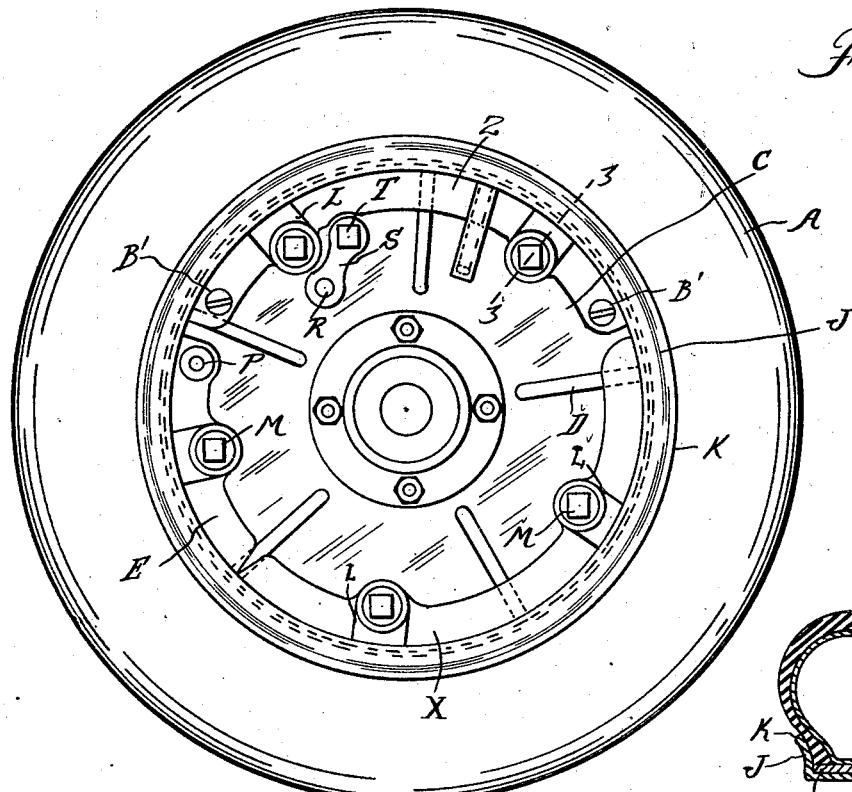
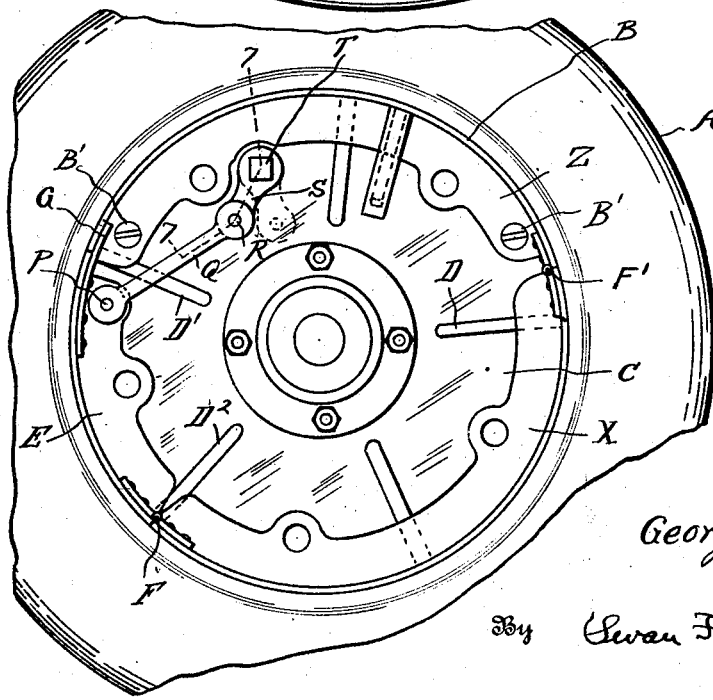

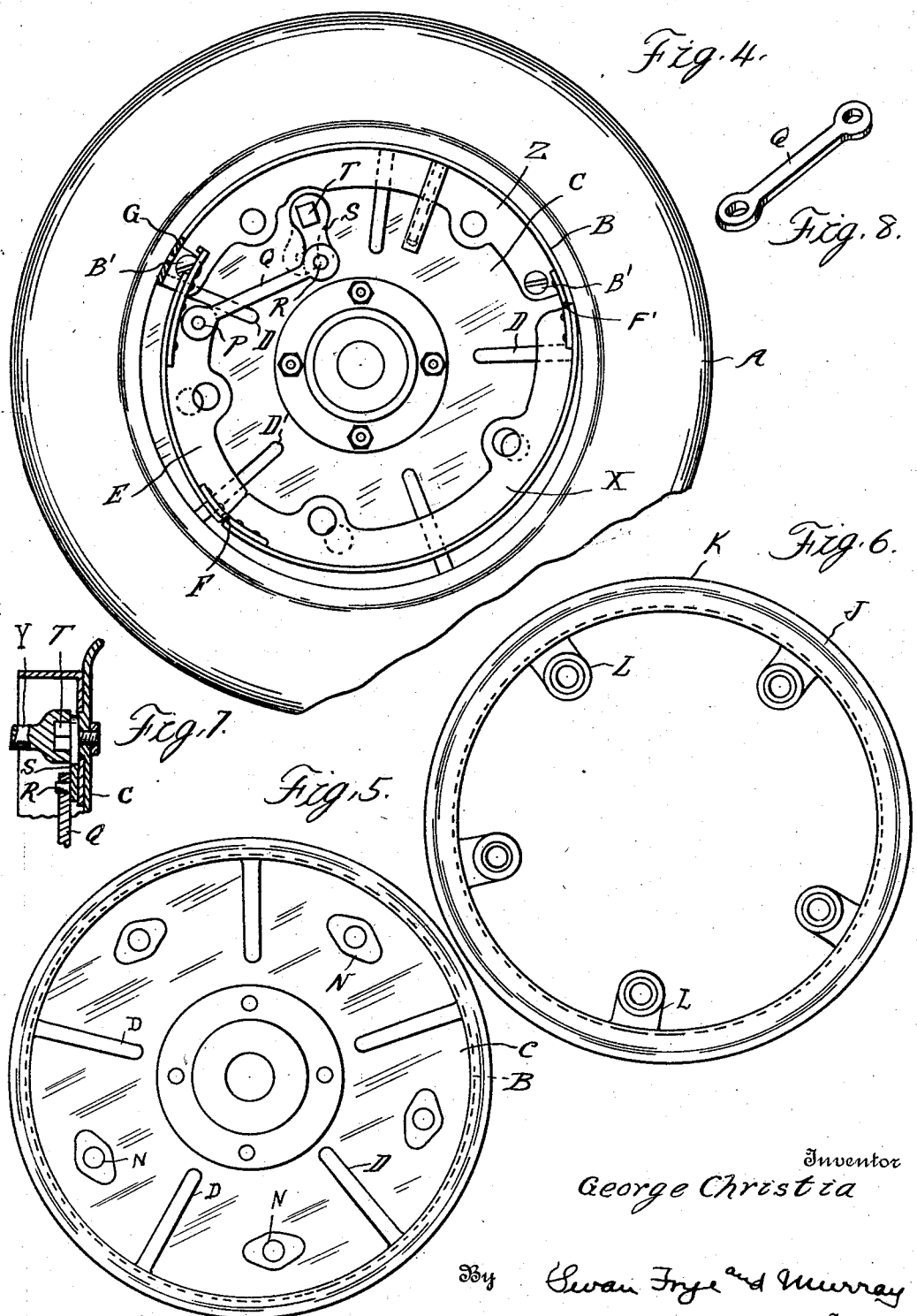

1,860,015

UNITED STATES PATENT OFFICE

GEORGE CHRISTIA, OF DETROIT, MICHIGAN

VEHICLE WHEEL

Application filed July 2, 1928. Serial No. 289,741.

This invention relates to an improved partially collapsible rim construction especially adapted for disc wheels, though not necessarily restricted thereto, and has for its object an improved organization of parts by means of which, at a minimum of weight as regards the total of material entering into the make-up of the completed article, provision may be made for securely holding a pneumatic tire in place about the rim when inflated and in use, and for quickly and easily demounting a deflated tire body for repair or change. The preferred form of embodiment of these improvements is illustrated in the accompanying drawings, in which Figure 1 is an elevational view of a wheel and tire assembly, with the parts in fully extended and positioned relation to one another.

Figure 2 is a fragmentary elevational view, bringing out the first step necessary in connection with the indrawing of the wheel and rim parts before removing the tire.

Figure 3 is a detail sectional view taken along the line 3—3 of Figure 1.

Figure 4 is an elevational view similar to Figures 1 and 2, showing a hinged portion of the tire rim retracted from its full tire-engaging position.

Figure 5 is an elevational view of the opposite face of the wheel web from that shown in Figures 1, 2, and 4.

Figure 6 is an elevational view of the tire-holding and spanning ring which is removably associated with the wheel rim.

Figure 7 is a detail elevational view taken along the line 7—7 of Figure 2.

Figure 8 is a perspective of a removable link member used for effecting the indrawing and projection of the hinged portion of the wheel rim.

A indicates a pneumatic or similar wheel tire, which is mounted upon the rim portion B, (including its curvingly coincident hinged section E) all of which latter is encircled by the peripheral edge of the web C, being held thereto in suitable manner, as by the screws B'. As brought out in Figures 1, 2, and 5 particularly, this web is provided at radial intervals with reinforcing ribs or deformations D, which may be either arranged equidistantly from one another, or positioned slightly unevenly as regards the distance between one another, so that they may particularly reinforce portions of the web and rim adjacent the hinged portion E of the rim B, which will be hereinafter referred to more in detail. I have indicated the positioning of two ribs thus at D' and D², in Figure 2.

The hingedly connected portions E and X of the rim B, when in fully extended position, coincide in their circular curvature with that of the fixed portion Z and with the rest of the rim as a whole, and are terminally connected with each other as by means of the hinges F and F'. When the rim is in fully extended position, as illustrated in Figures 1 and 2, the freely swinging end of the hinged rim portion E abuts the adjacent free end of the fixed rim portion Z, being kept from swinging therebeyond by the engagement thereover of the lip G.

With the parts in this position, the annular piece J, whose outside diameter corresponds substantially with the inside diameter of the rim B when the latter is fully extended, is slipped into the dished space formed by the disc C and the rim B, its outer flanged edge K extending sufficiently far over the edge of the rim B and overlappingly of the adjacent rim-engaging portion of the tire A to prevent the slipping off of the latter therefrom. At intervals about the inner edge of this ring J project tongues L, provided with suitable screw or bolt holes, through which screws or bolts M may pass into corresponding seats N provided in the adjacent portion of the disc C. When thus assembled the tire and the various portions of the rim structure are held in efficiently tight relation to one another for use of the wheel in the ordinary way.

To disassemble these parts, one must first remove the screws or bolts M which hold the spanner ring J in place. Then there is preferably slipped over the stud P in the flange of the hinged rim portion E the correspondingly apertured end of a link Q, which when the tire is in use may be stowed away in the tool kit, the same as a wrench or screw driver, the other apertured end of this link being slipped over the stud R which is carried on the end of the lever S which is supported from the disc C by means of the nut crowned shaft T. By positioning a wrench, about this nut-crowned end of the shaft T, or if instead of a nut terminal a screw head is used and a screw driver used to effect this turning, the lever S may be swung sufficiently to draw the link Q lengthwise of itself, thus drawing the hinged rim portion E out of peripheral alignment with the main rim portion B; this is brought out particularly in Figure 4. The removal of the rubber tire or casing from the thus temporarily mutilated rim is then easily effected, and as soon as a new tire or the repaired tire has been placed in position about the rim B the restoration of the rim portion E to its former position of peripheral alignment of the rim portion B may be proceeded with, by wrench-induced swing of the lever S in the opposite direction from that just described after which the link Q is taken off and the spanner rim J put in place and screwed into structural relation with the web C by means of the bolts M. The approximate degree of swing of the lever S is indicated contrastingly by the full-line and dotted-line representations of this member in Figures 2 and 4.

What I claim is:

1. A vehicle wheel having in combination, a disc and a partly circumferential rim section secured to one side thereof, a second rim section hingedly connected at one end with the adjacent end of said first-named rim section, and a ring member adapted to engage interiorly of said rim sections when the latter are in their normal extended position, for holding said hinged rim section against centripetal swinging movement.

2. In a disc wheel assembly, in combination with the disc thereof, a plurality sectioned rim member having one of its constituent sections fixedly carried by the peripheral edge of said disc and another of its sections hingedly connected at one end to the adjacent end of the first-mentioned rim section, a removable rim and tire-engaging spanner adapted to engage interiorly of said rim sections, when the latter are in positions of circular alignment, and means formed on said disc and said second named rim section, adapted to receive removable manipulating means whereby the second mentioned rim section may be drawn away from its described position of circular alignment with the first-mentioned rim section after the removal of said spanner has been effected.

3. In combination with a wheel disc and a partly circumferential rim section connected therewith, a plurality of rim sections hingedly connected with each other, and one of which is hingedly connected at one end with said first-named rim section, said rim sections being in substantial alignment, when in operative position, with the peripheral edge of said wheel disc, means for locking the parts in such position, comprising an annular bracing member and means formed on said disc and on a hinged rim section adapted to receive removable manipulating means whereby the hinged rim section may be indrawn preparatory to the positioning about or removal from the periphery of the wheel of a tire member.

4. In combination with a rim for a vehicle wheel, comprising a plurality of hingedly connected sections having a pair of abutting free ends, a disc member with which one of said rim sections having a free end is fixedly connected, means for structurally associating the other rim sections with said disc member when the former are in extended position, and for securing the same, comprising an annular bracing member, and means formed on said disc and on one of the hinged rim sections to receive removable manipulating means for effecting the inward and/or outward swing of said hinged rim sections to enable removal of a tire from the rim as a whole or mounting of the same thereon.

5. In combination with a disc, a plurally sectioned rim member having its periphery in substantial alignment with the periphery of said disc, a certain section of the rim being fixedly carried thereby and another of the component sections of the rim being hingedly connected at one of its ends with the adjacent end of the fixed portion of the rim in position for actuated inward swing from its normal position of truly circular coincidence therewith, a removable spanner member of substantially the same peripheral size and contour as the inner surface of the component sections of the rim when in extended position, adapted to be positioned interiorly thereof and against the adjacent face of the disc, to hold the rim sections in their described extended position.

In testimony whereof I sign this specification.

GEORGE CHRISTIA.